UNITED STATES PATENT OFFICE.

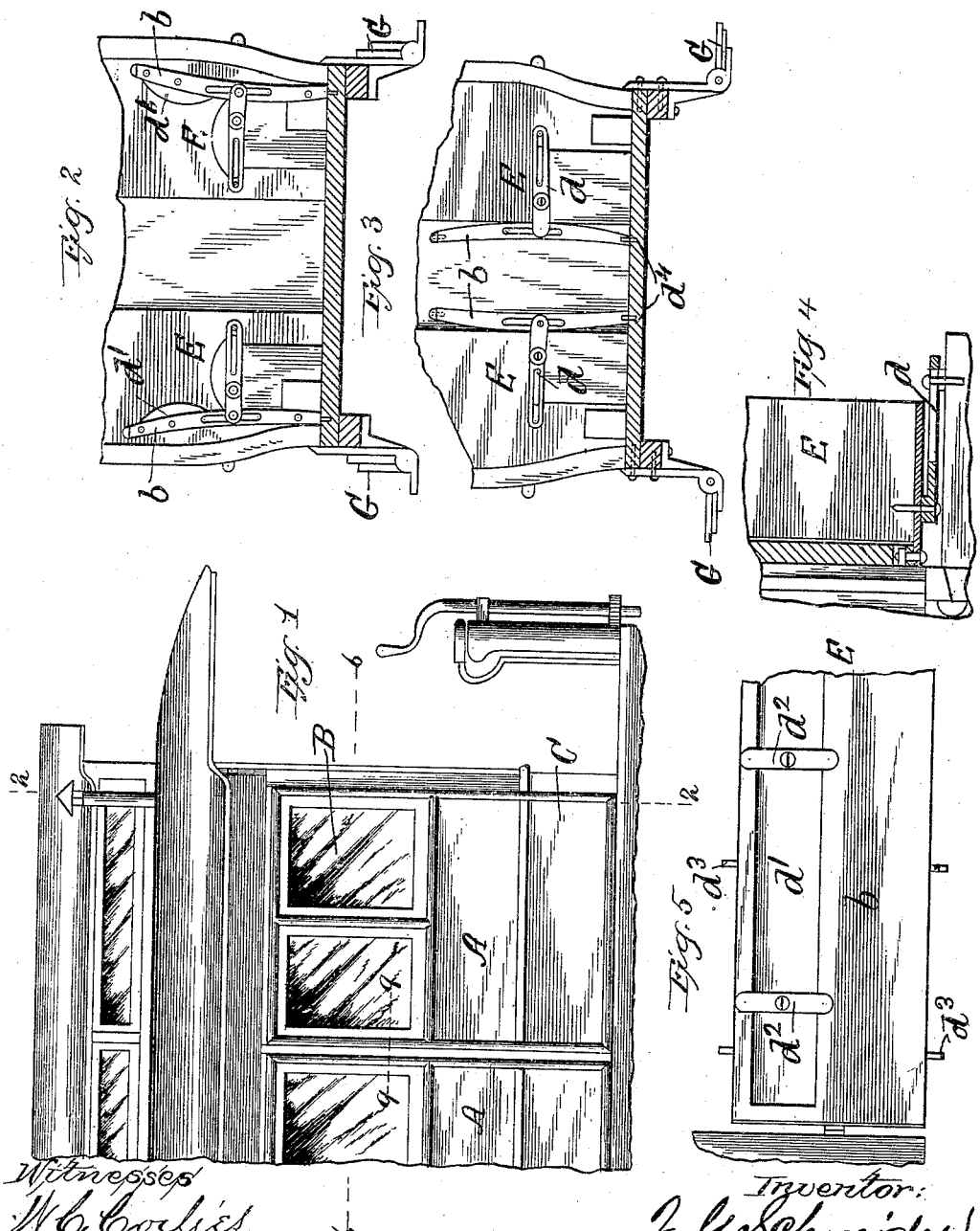

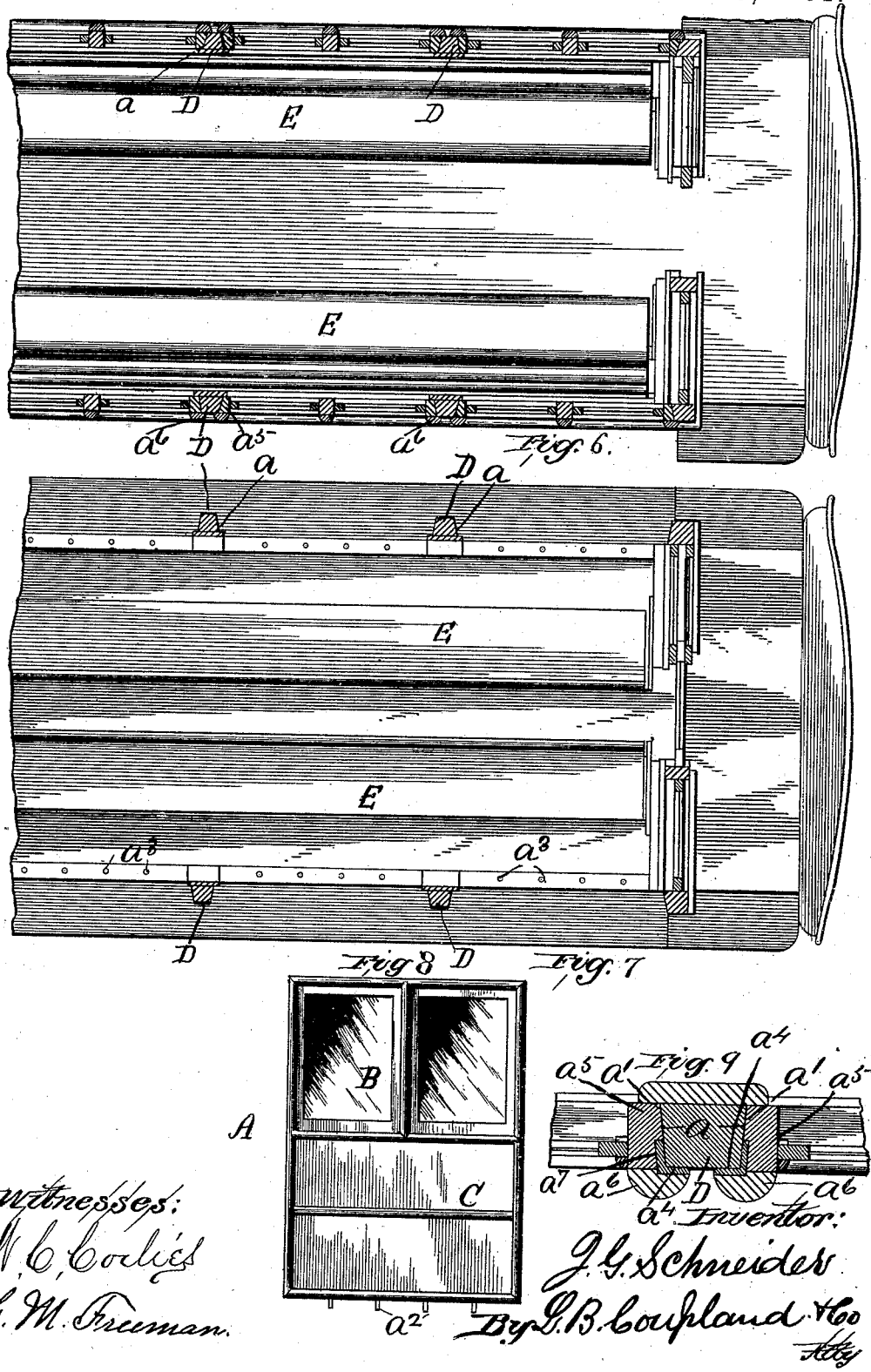

JOHN G. SCHNEIDER, OF CHICAGO, ILLINOIS, ASSIGNOR OF ONE-HALF TO FRANK RIEDLE, OF SAME PLACE.

STREET-CAR.

SPECIFICATION forming part of Letters Patent No. 445,941, dated February 3, 1891.

Application filed November 5, 1890. Serial No. 370,367. (No model.)

*To all whom it may concern:*

Be it known that I, JOHN G. SCHNEIDER, a citizen of the United States, residing at Chicago, in the county of Cook and State of Illinois, have invented certain new and useful Improvements in a Passenger or Street Car, of which the following is a full, clear, and exact description, that will enable others to make and use the same, reference being had to the accompanying drawings, forming a part of this specification.

This invention relates to improvements in street or railway cars and vehicles of a similar character which are adapted to be readily converted into either a summer or winter structure, as may be required.

Figure 1 is a broken-away side elevation of a car structure embodying my improved features; Fig. 2, a broken-away vertical transverse section in plane 2, Fig. 1; Fig. 3, a similar view showing the seats in a different position; Fig. 4, a broken-away horizontal section in the plane of arm $d$; Fig. 5, a broken-away back view of one of the seats; Fig. 6, a broken-away horizontal section in plane 6, Fig. 1, showing the closed or winter arrangement; Fig. 7, a section in the same plane, showing the open or summer arrangement; Fig. 8, an elevation of one of the removable panel and window sections; and Fig. 9, a broken-away horizontal section in plane 9, Fig. 1.

The sides of the structure consist of a number of removable rectangular-shaped sections A, which embrace the window and panel section in one, extending from the letter-board to the bottom or floor of the car, B representing the window-section, and C the panel-section.

The framing-posts D are beveled on each side, as at $a$, (see Figs. 6, 7, and 9,) the joining edges of the removable panel and window sections being correspondingly beveled, as at $a'$, Fig. 9, so as to wedge together, forming a tight joint.

The panel and window sections may be removably fastened in place in any suitable manner, whereby they can be conveniently taken out or replaced when changing the character of the structure.

The pins $a^2$, (see Fig. 8,) set in the lower edge of the panel-sections, are adapted to engage with the corresponding apertures $a^3$ in the bottom of the car when said sections are inserted in place.

The angle-shaped rubber packing-strips $a^4$ overlap the outside corners of the framing-posts, and are interposed between the same and the panel-framing $a^5$ and the outside molding $a^6$, as shown in Fig. 9. The panel-frame and molding are provided with a recess $a^7$, in which the packing is seated.

The seats E E are arranged at each side and run lengthwise of the car, as shown in Figs. 2, 3, 6, and 7. Figs. 2 and 6 show the winter structure, the panel-sections being in place, the backs $b$ of the seats turned over against the sides of the car, and the steps G folded up out of the way. The winter structure is converted into the open or summer car (shown in Figs. 3 and 7) by removing the panel and window sections, throwing the backs of the seats over on the opposite side, and turning down the steps running along the sides of the cars. In the summer arrangement sufficient space is left between the adjacent backs of the seats to form the aisle or passage-way $b'$ for the convenience of the conductor in collecting fares.

The respective ends of the seats are provided with the usual slotted and pivoted arm $d$, so that the position of the backs may be readily changed, as shown in Fig. 4.

The upholstered part $d'$ of the back, for use in the winter or closed car, is removable, and is retained in place by the pivotal clamps $d^2$, located on the back part, as shown in Fig. 5. This feature permits of the removal of the upholstered part of the seat-back when the backs are turned over in the summer car, as that change would bring the upholstering near the bottom of the car, and thus ruin the same.

The pins $d^3$ in the opposite edges of the seat-back are adapted to engage with apertures $d^4$ in the floor of the car.

Having thus described my invention, what I claim, and desire to secure by Letters Patent, is—

1. A convertible car wherein the panels and windows forming the sides of the structure are adapted to be removed jointly in sections, the seats having adjustable backs and running lengthwise of the car, whereby said seats may be made to face outwardly when the joint panel and window sections are removed and inwardly when the same are replaced, leaving an aisle or passage through the center of the car when in either position, and the folding steps arranged lengthwise of and on the respective sides of the car, substantially as described.

2. In a convertible car as described, the removable joint panel and window sections, the seats running lengthwise of the structure and provided with adjustable backs, which may be turned to face inwardly or outwardly with reference to the removable panel and window sections, one-half of the backs of said seats being removable on a line running through the longitudinal center thereof, as described, and the seats arranged lengthwise of and located at each side of the structure and adapted to fold up when not required for use, substantially as described.

JOHN G. SCHNEIDER.

Witnesses:
L. M. FREEMAN,
J. P. DONALSON.